United States Patent [19]

Murai

[11] 3,787,638

[45] Jan. 22, 1974

[54] HALL ELEMENT MAGNETIC HEAD HAVING INTEGRAL MEANS FOR DETECTING THE AMOUNT OF HEAD MATERIAL GROUND AWAY DURING A MACHINE OPERATION

[75] Inventor: Masayuki Murai, Tokyo, Japan

[73] Assignee: Pioneer Electronic Corporation, Tokyo, Japan

[22] Filed: Apr. 25, 1972

[21] Appl. No.: 247,294

[30] Foreign Application Priority Data

Apr. 29, 1971 Japan .............................. 46/28393

[52] U.S. Cl. ........................ 179/100.2 CH, 29/603

[51] Int. Cl......... G11b 5/38, G11b 5/42, G11b 5/46

[58] Field of Search 179/100.2 CH, 100.2 C; 29/603; 51/165.75

[56] References Cited

UNITED STATES PATENTS

| | | | |
|---|---|---|---|
| 3,495,049 | 2/1970 | Humphreys et al. | 179/100.2 C |
| 3,643,035 | 2/1972 | Tsukagosmi et al. | 179/100.2 CH |

*Primary Examiner*—Vincent P. Canney
*Assistant Examiner*—Robert S. Tupper
*Attorney, Agent, or Firm*—Sughrue, Rothwell, Mion, Zinn & Macpeak

[57] ABSTRACT

A magnetic head having one or more magneto-electric converting elements, for example, a Hall element, comprises one or more leads which are used, when the magnetic head is manufactured, for measuring the amount of head material ground away from between a front surface of the magnetic head and the front edge of the magneto-electric converting element.

8 Claims, 6 Drawing Figures

HALL ELEMENT MAGNETIC HEAD HAVING INTEGRAL MEANS FOR DETECTING THE AMOUNT OF HEAD MATERIAL GROUND AWAY DURING A MACHINE OPERATION

BACKGROUND OF THE INVENTION

1. Field of the Invention

The present invention relates generally to a magnetic module head for use with magnetic reproducing equipment. More particularly, the magnetic module head has a plurality of magneto-electric converting elements, for example, Hall elements, in a film form and a plurality of leads or terminals for providing electrical connections to external circuits, and further the head has one or more leads or terminals for use during the manufacturing process.

2. Description of the Prior Art

In the manufacturing of prior art magnetic heads of the ring core type, which is the most popular type, the front surface of the magnetic head is ground while the impedance of the head coil is measured, and the amount of head material ground off or removed is indicated by the measured impedance value. However, such method cannot be adapted to the manufacturing of a magnetic module head including semiconductor elements, such as Hall elements for example, instead of coils. In the manufacturing of such a semiconductor-type module head, the front surface of the magnetic head must be ground while the amount of material being removed is being measured, and the amount of material to be ground off is determined by the distance between the front edge of a substrate and the front edge of the semiconductor element formed on the substrate.

In the prior art mass production process, for semiconductor-type heads, each substrate which will compose one half of the final head construction is manufactured to be of uniform size; one or more magnetoelectric converting elements are uniformly formed in film form by vacuum deposition onto each substrate; electric leads for the elements are formed onto each substrate by evaporating thereon a metal; one or more magnetic circuit elements, for example, a plurality of ferrite tips, which will compose the other half of the head construction, are attached firmly to each substrate so as to correspond with each element; and by these steps, the fundamental construction of a head is accomplished; but then the front surface of the head must be ground to a uniform size which has been previously designed. However, the distances between the front surface of the head and the front edges of each of the elements are not always identical. Consequently, such manufactured heads have uneven characteristics relative to each other; that is, the reproducibility factor of the prior art process for producing a plurality of uniform heads is low.

SUMMARY OF THE INVENTION

It is therefore an object of the present invention to provide a novel and improved magnetic module head and a method of manufacturing the same which eliminates the aforementioned disadvantages of the prior art. The present invention is capable of providing a positive and efficient manner of accurately grinding a front surface of the magnetic module head.

BRIEF DESCRIPTION OF THE DRAWINGS

Other objects, features and advantages of the present invention will become apparent from the following description taken in conjunction with the drawings in which.

DESCRIPTION OF THE PREFERRED EMBODIMENTS

Figure 1:
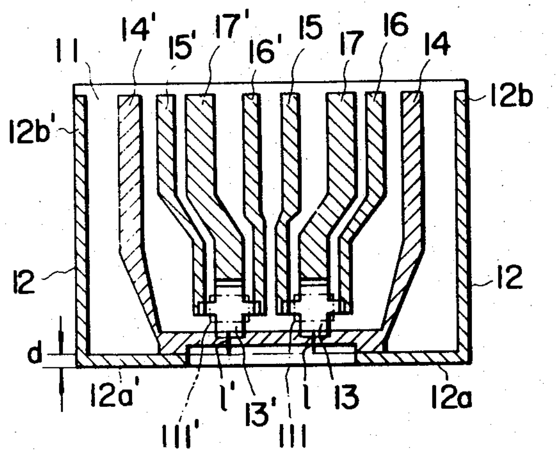
FIG. 1 is a plan view of a first embodiment of a substrate on which two Hall elements and leads are provided.
Figure 2:
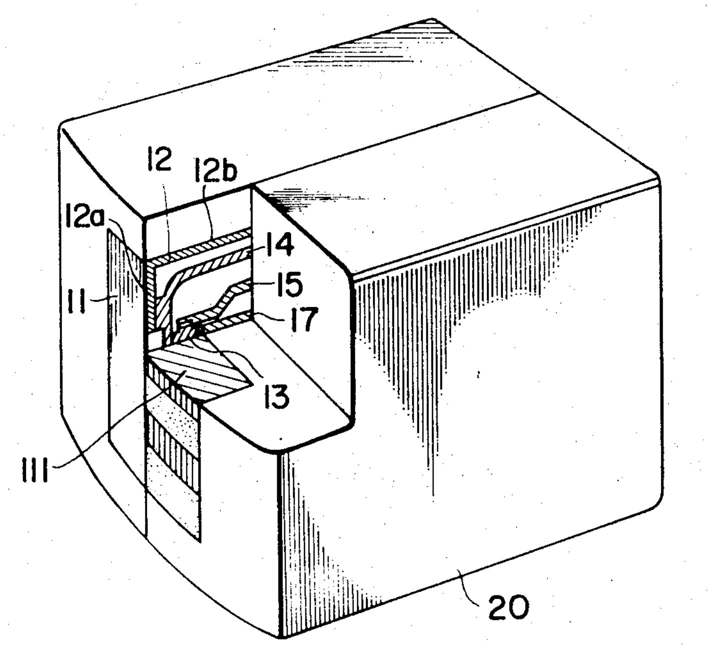
FIG. 2 is a cut-away perspective view of the embodiment illustrated in FIG. 1.
Figure 3:
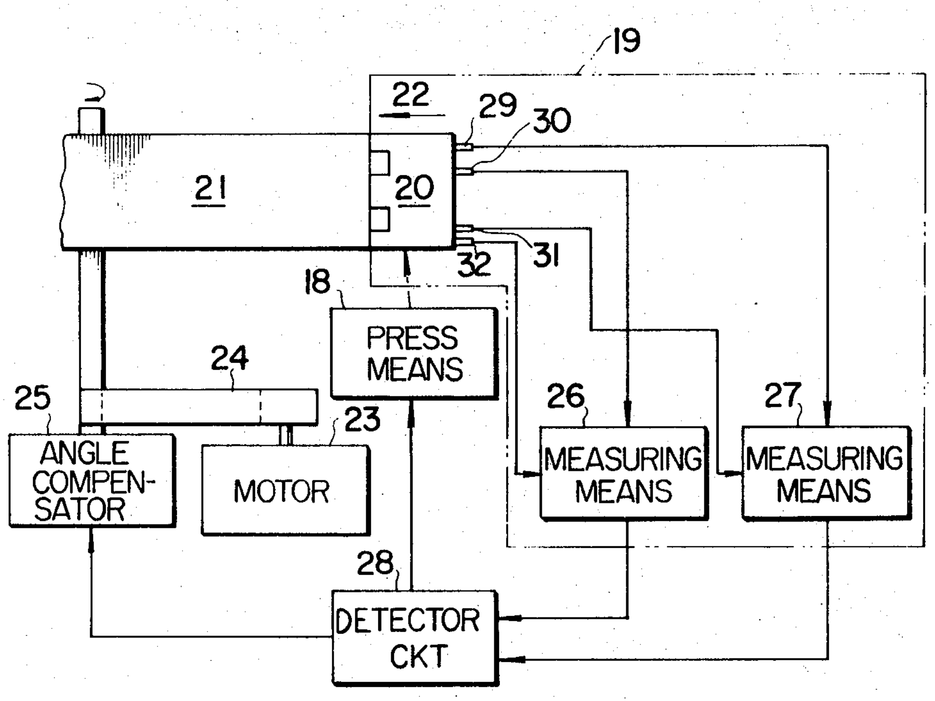
FIG. 3 is a block diagram of a grinding apparatus by which the front surface of a magnetic head is ground.

Referring to FIGS. 1 to 3 as one embodiment of the present invention, a two channel magnetic module head, including two Hall elements, and a method of manufacturing the same will be explained in detail.

In FIG. 1, two Hall elements 13 and 13' of indium antimonide are formed in film form on a ferrite substrate 11 by vacuum deposition using an evaporation-mask. Then, electroconductive materials are deposited on the substrate in a common process to form ground leads 14 and 14', voltage leads 17 and 17', current leads 15, 15', 16 and 16', and detector leads 12 and 12' which are used in the grinding process, whereby the distance dimension $l$ between the Hall element 13 and the front part **12*a* of the detector lead 12, and the distance dimension $l'$ between the Hall element 13' and a front part 12*a'* of detector lead 12', are accurately determined. Finally, ferrite tips 111 and 111' are affixed to the ferrite substrate 11 so as to hold Hall elements 13 and 13' in each magnetic circuit, and then they are assembled in a head module 20 as shown in FIG. 2**.

Referring now to FIG. 3, the rear part **12*b* of the detector lead 12 as shown in FIGS. 1 and 2 is connected to a terminal 29 of the magnetic head 20, and the rear part 12*b'* of the detector lead 12' is connected to a terminal 30 of the magnetic head 20. Similarly, the ground lead 14 of the Hall element 13 is connected to a ground terminal 31 of the magnetic head 20, and the ground lead 14' is connected to a ground terminal 32. Further, the terminal 29 and the ground terminal 31 are connected to a measuring means 27, and the terminal 30 and the earth terminal 32 are connected to a measuring means 26. These components define a resistance measuring circuit 19** whose operation is described below.

Then, the magnetic head 20 is contacted by a grinder 21, and the head is continuously pushed by a press means 18 in the direction indicated by an arrow 22. In this situation, the front face of the magnetic head 20, and inevitably each front part **12*a* and 12*a'* of the detector leads 12 and 12' are grounded by the grinder 21 which is rotated by a motor 23 through a belt 24**.

The symbol $d$ of FIG. 1 designates the amount of substrate to be ground away. When the front of the magnetic head 20 is ground down to $d$, the front parts **12*a* and 12*a'* of the detector leads 12 and 12' are also ground away, so that detector lead 12 is disconnected from the ground lead 14, and simultaneously therewith the other detector lead 12' is disconnected from the other ground lead 14'. Thereby, the resistance value between the detector lead 12 and ground lead 14 and that between the detector lead 12' and ground lead 14' becomes infinite, and the measuring means 26 and 27** respectively detect these changes in resistance.

If both measuring means 26 and 27 simultaneously detect such resistance changes, that is, if each resistance value becomes infinite at the same time, a detector circuit 28 operates, thereby causing the press means 18 to release and the motor 23 to stop, so that the grinding operation is terminated. On the other hand, if both measuring means 26 and 27 do not simultaneously detect changes to infinite resistance, that is, for example, if detector lead 12 is disconnected from ground lead 14 while the other detector lead 12' is not disconnected from the ground lead 14', then the detector circuit 28 controls an angle compensator 25, whereby the angle of the grinder 21 is compensated to grind away more of front part **12*a'*, and the grinding operation is continued. Then, when the detector lead 12' is disconnected from the ground lead 14', the detector circuit 28 detects the resistance variation, thereby causing the press means 18 to release and the motor 23** to stop so as to terminate the grinding operation.

Other embodiments are variations of this detector lead concept and are described below and illustrated in FIGS. 4 – 6.

Figure 4:
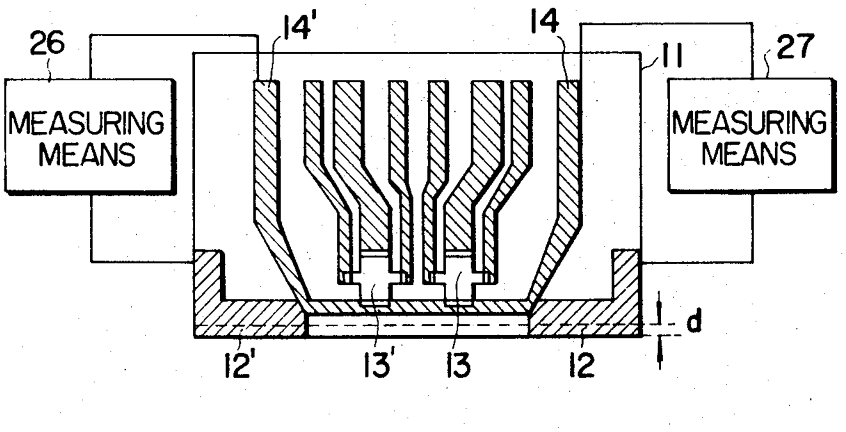
FIG. 4 is a plan view of a second embodiment of the substrate according to the present invention.

In FIG. 4, ground leads 14 and 14' are formed on the substrate 11 with a good conductor of current, and detector leads 12 and 12' are formed with a resistance material. Then the ground lead 14 and the detector lead 12 are connected to the measuring means 26, and the ground lead 14' and the detector lead 12' are connected to the measuring means 27. The front face of the magnetic head 20 is then ground while the resistance values of the detection leads are measured by measuring means 26 and 27, respectively. Therefore, the angle between the grinder and the magnetic head 20 is continuously compensated and kept accurate during the grinding operation. When the resistance values of both detector leads become equal to a predetermined value, the grinding operation is stopped.

In this embodiment, the angle of the magnetic head is continuously compensated, and the predetermined resistance value can be selected at will; consequently, the front face of the magnetic head can be ground accurately, and the amount of grinding can be easily controlled in due consideration of the sensibility of the Hall element.

Figure 5:
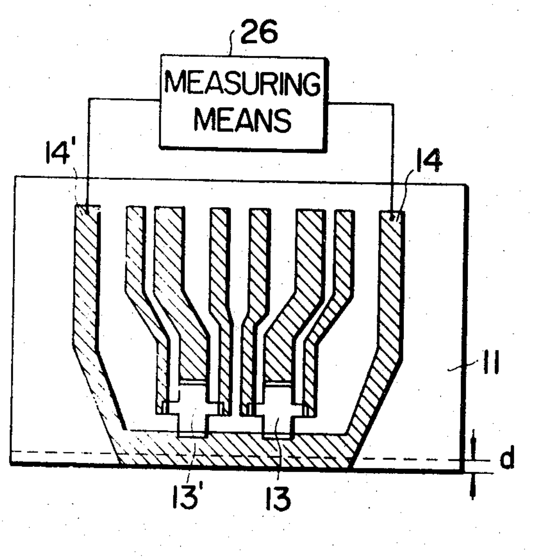
FIG. 5 is a plan view of a third embodiment of the substrate according to the present invention.

Referring now to FIG. 5, ground leads 14 and 14' are formed with a low-resistance material and function as the detector leads 12 and 12' of FIG. 4. The ground leads 14 and 14' are connected to the measuring means 26 so as to measure any variation in the resistance of the leads. In this embodiment, separate detector leads are not necessary, and therefore a part of the manufacturing process may be abbreviated.

Figure 6:
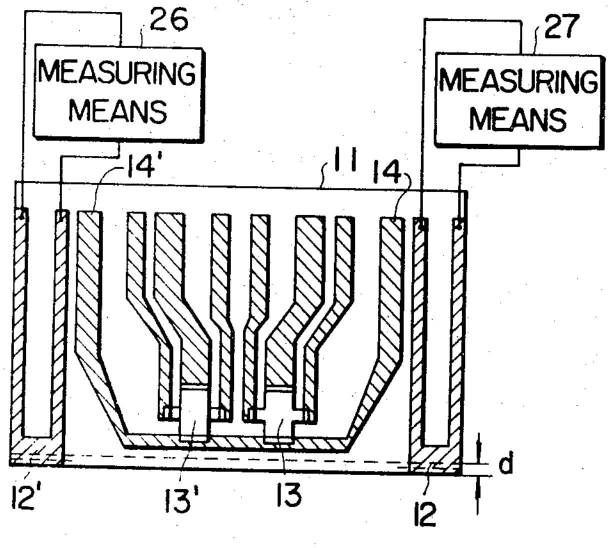
FIG. 6 is a plan view of the fourth embodiment of the substrate according to the present invention.

Referring to FIG. 6, U-shaped detector leads 12 and 12' of resistance material are formed so that they are electrically separated from ground leads 14 and 14'. Both ends of the detector lead 12' are connected to the measuring means 26, and both ends of the detector lead 12 are connected to the measuring means 27, so as to measure the variation of resistance in each detector lead during the grinding operation. In this embodiment, the Hall elements are not affected by the grinding operation.

In the above embodiments, the Hall elements and the detector leads are formed on the same substrate; however, the detector leads may be formed on another substrate which is positioned adjacent the substrate having the Hall elements.

According to this invention, as hereinbefore described, many improvements over the prior art can be obtained. First, the amount of grinding can be easily controlled and, after grinding, the magneto-electric converting element, i.e., Hall element, can be positioned accurately against the front face of the magnetic head. Second, by measuring the resistance of the detector leads, the grinding process becomes simple, and magnetic heads of the same characteristic are easily reproduced in large quantities. Third, when plural magneto-electric converting or Hall elements are employed, the dimensions between the front face of the magnetic head and each element are accurately determined, thereby the characteristics of all elements become equal to each other. Fourth, when the detector lead is formed of a resistance material, the dimension between the front face of the magnetic head and the element can be easily selected at will in due consideration of the sensibility of the magneto-electric converting element.

While the invention has been particularly shown and described with reference to preferred embodiments thereof, it will be understood by those skilled in the art that various changes in form and details may be made therein without departing from the spirit and scope of the invention.

What is claimed is:

1. A magnetic head for use with a magnetic recording medium comprising: at least one substrate, one or more magneto-electric converting element means vapor deposited onto the substrate, necessary leads vapor deposited on said substrate and connected to said element means, and detector means including detector leads vapor deposited on said substrate for measuring the position of said element means relative to the operative surface of said substrate which contacts the magnetic recording medium.

2. A magnetic head as defined in claim 1 wherein said detector leads and said necessary leads are of the same material.

3. A magnetic head as defined in claim 1 wherein said detector leads are made of relatively high resistance material and the remaining leads are made of highly conductive material.

4. A magnetic head as defined in claim 1 wherein at least one of said detector leads is also connected to said element means.

5. A magnetic head as defined in claim 1 wherein at least one of said detector leads and one of said necessary leads are electrically connected together such that removal of the substrate material interrupts the connection therebetween.

6. A magnetic head as defined in claim 1 wherein said magnetoelectric converting element means is a Hall element.

7. A magnetic head as set forth in claim 1 wherein said at least one substrate is made of a highly permeable magnetic material.

8. A magnetic head as defined in claim 7 wherein said magnetic head comprises two detector leads, and wherein said magneto-electric converting means comprises two Hall elements, each of said detector leads being connected in an electric circuit with the corresponding Hall elements, whereby removal of the substrate material interrupts either or both of the connections.

* * * * *